(12) United States Patent
Lee

(10) Patent No.: US 6,805,847 B2
(45) Date of Patent: Oct. 19, 2004

(54) LIQUID PHASE OXIDATION REACTOR

(75) Inventor: Jae-sung Lee, Kyungsangbuk-do (KR)

(73) Assignee: Pohang University of Science and Technology Foundation, Kyungsangbuk-do (KR)

(*) Notice: Subject to any disclaimer, the term of this patent is extended or adjusted under 35 U.S.C. 154(b) by 567 days.

(21) Appl. No.: 09/893,694

(22) Filed: Jun. 29, 2001

(65) Prior Publication Data
US 2002/0015671 A1 Feb. 7, 2002

(30) Foreign Application Priority Data
Jun. 29, 2000 (KR) .......................... 2000-36368

(51) Int. Cl.⁷ .................................................. B01F 7/00
(52) U.S. Cl. ....................................... 422/224; 422/225
(58) Field of Search ................................ 422/224, 225; 261/83, 84, 87, 89, 90; 366/102, 103, 104

(56) References Cited

U.S. PATENT DOCUMENTS

| | | | |
|---|---|---|---|
| 3,880,359 A | * 4/1975 | Novy | 239/565 |
| 4,243,633 A | * 1/1981 | Hozuma et al. | 422/129 |
| 4,519,959 A | * 5/1985 | Takeuchi et al. | 261/93 |
| 4,905,900 A | * 3/1990 | Scharton et al. | 239/99 |
| 5,252,298 A | * 10/1993 | Jones | 422/172 |

FOREIGN PATENT DOCUMENTS

| | | |
|---|---|---|
| DE | 88 09 895 | 10/1988 |
| EP | 477 818 | 4/1992 |
| EP | 847 800 | 6/1998 |
| JP | 61-222526 | * 10/1986 |

* cited by examiner

Primary Examiner—Kiley Stoner
Assistant Examiner—Jonathan Johnson
(74) Attorney, Agent, or Firm—Leydig, Voit & Mayer, Ltd.

(57) ABSTRACT

A liquid phase oxidation reactor is provided. The liquid phase oxidation reactor includes: a substantially cylindrical reaction vessel having an interior space of a predetermined volume; a lid combined with the reaction vessel on top of the reaction vessel; one or more stirring blades disposed within the reaction vessel and rotating by a driving source disposed on the outside of the reaction vessel; a liquid phase supplying line disposed at a sidewall of the reaction vessel for supplying a liquid phase reactant to the reaction vessel; a liquid phase discharging line disposed at a sidewall of the reaction vessel for draining a product obtained through a chemical reaction out of the reaction vessel; a gas feed nozzle formed in a bent shape for supplying an oxygen containing gas to the reaction vessel; and an angle adjusting means for supporting the gas feed nozzle so that the gas feed nozzle is turned so that the outlet thereof faces one of the stirring blades or the interior sidewall of the reaction vessel.

5 Claims, 5 Drawing Sheets

LIQUID PHASE OXIDATION REACTOR

BACKGROUND OF THE INVENTION

1. Field of the Invention

The present invention relates to a liquid phase oxidation reactor, and more particularly, to a liquid phase oxidation reactor having an improved structure such that oxidation of a reaction solvent can be reduced by adjusting an effective contact time during which an oxygen-containing gas is in contact with a reactant in manufacturing an aromatic organic acid.

2. Description of the Related Art

Typically, liquid phase oxidation reactions are widely used for a process of manufacturing compounds. A process for manufacturing an aromatic organic acid is a representative example of liquid phase oxidation reactions. Aromatic organic acids are important fundamental chemical materials, and in particular starting materials of fibers, resins, and plasticizers and the like. For example, terephthalic acids for polyester fibers have been produced in large quantities throughout the world. A conventional liquid phase oxidation reactor for manufacturing an aromatic organic acid is constructed such that a rotary stirring blade is installed in a cylindrical reaction vessel. In order to perform liquid phase oxidation, reactants including alkyl substituted aromatics such as para-xylene and a mixture of reaction solvents such as acetic acid, and an oxidation catalyst are supplied to a reaction vessel while an oxygen containing gas such as air is supplied to the stirring blade.

The conventional liquid phase oxidation reactor performs conversion to aromatic organic acid, which is the objective of this reaction, in the vicinity of the stirring blade along with oxidation of the reaction solvent. However, in the process of converting the reactants into aromatic acid through oxidation, a significant amount of solvent is also oxidized and thereby consumed.

SUMMARY OF THE INVENTION

To solve the above problems, it is an object of the present invention to provide a liquid phase oxidation reactor capable of economically manufacturing an aromatic organic acid while minimizing oxidation of a reaction solvent.

Accordingly, to achieve the above object, the present invention provides a liquid phase oxidation reactor including: a substantially cylindrical reaction vessel having an interior space of a predetermined volume; a lid combined with the reaction vessel on top of the reaction vessel; one or more stirring blades disposed within the reaction vessel and rotating by a driving source disposed on the outside of the reaction vessel; a liquid phase supplying line disposed at a sidewall of the reaction vessel 11 for supplying a liquid phase reactant to the reaction vessel; a liquid phase discharging line disposed at a sidewall of the reaction vessel for draining a product obtained through a chemical reaction out of the reaction vessel; a gas feed nozzle formed in a bent shape for supplying an oxygen containing gas to the reaction vessel; and an angle adjusting means for supporting the gas feed nozzle so that the gas feed nozzle is turned so that the outlet thereof faces one of the stirring blades or the interior sidewall of the reaction vessel. The angle of the gas feed nozzle is adjusted in order to control effective contact time during which liquid is in contact with gas reactants and to minimize the burning of a solvent. The angle adjusting means comprises a first bearing fixed into a through hole in the reaction vessel for supporting the gas feed nozzle so that the gas feed nozzle can be turned and a control lever fixed to the gas feed nozzle disposed on the outside of the reaction vessel and manipulated by a user's hands. The angle adjusting means further includes a second bearing disposed between the gas feed nozzle and a gas supplying line for supplying the oxygen containing gas to the gas feed nozzle for supporting the gas feed nozzle so that the gas feed nozzle can turn with respect to the gas supplying line.

The present invention also provides a liquid phase oxidation reactor including: a substantially cylindrical reaction vessel having an interior space of a predetermined volume; a lid combined with the reaction vessel on top of the reaction vessel; one or more stirring blades disposed within the reaction vessel and rotating by a driving source disposed on the outside of the reaction vessel; a liquid phase supplying line disposed at a sidewall of the reaction vessel for supplying a liquid phase reactant to the reaction vessel; a liquid phase discharging line disposed at a sidewall of the reaction vessel for draining a product obtained through a chemical reaction out of the reaction vessel; and a gas feed nozzle formed in a bent shape for supplying an oxygen containing gas to the reaction vessel and fixedly installed so that the outlet thereof faces the interior sidewall of the reaction vessel.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
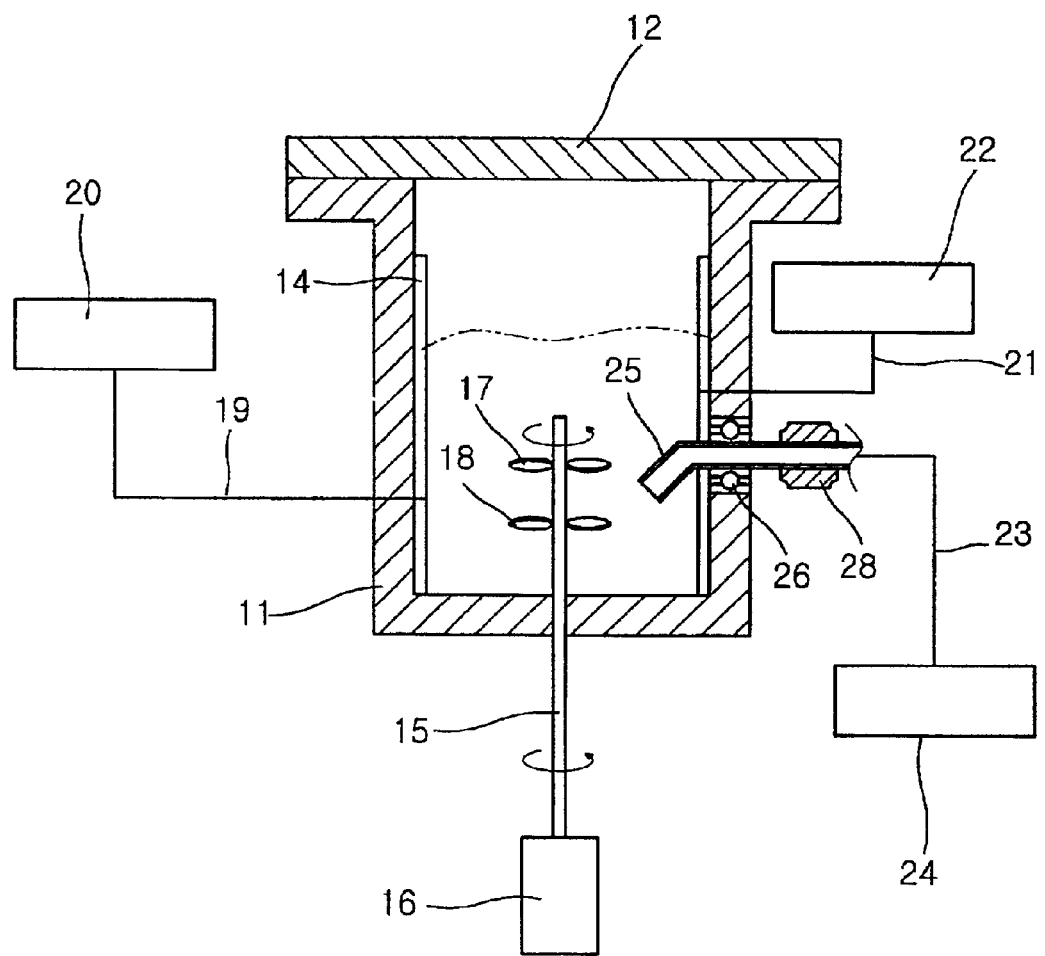
FIG. 1 is a schematic cross-section of a liquid phase oxidation reactor according to a first preferred embodiment of the present invention.
Figure 2:
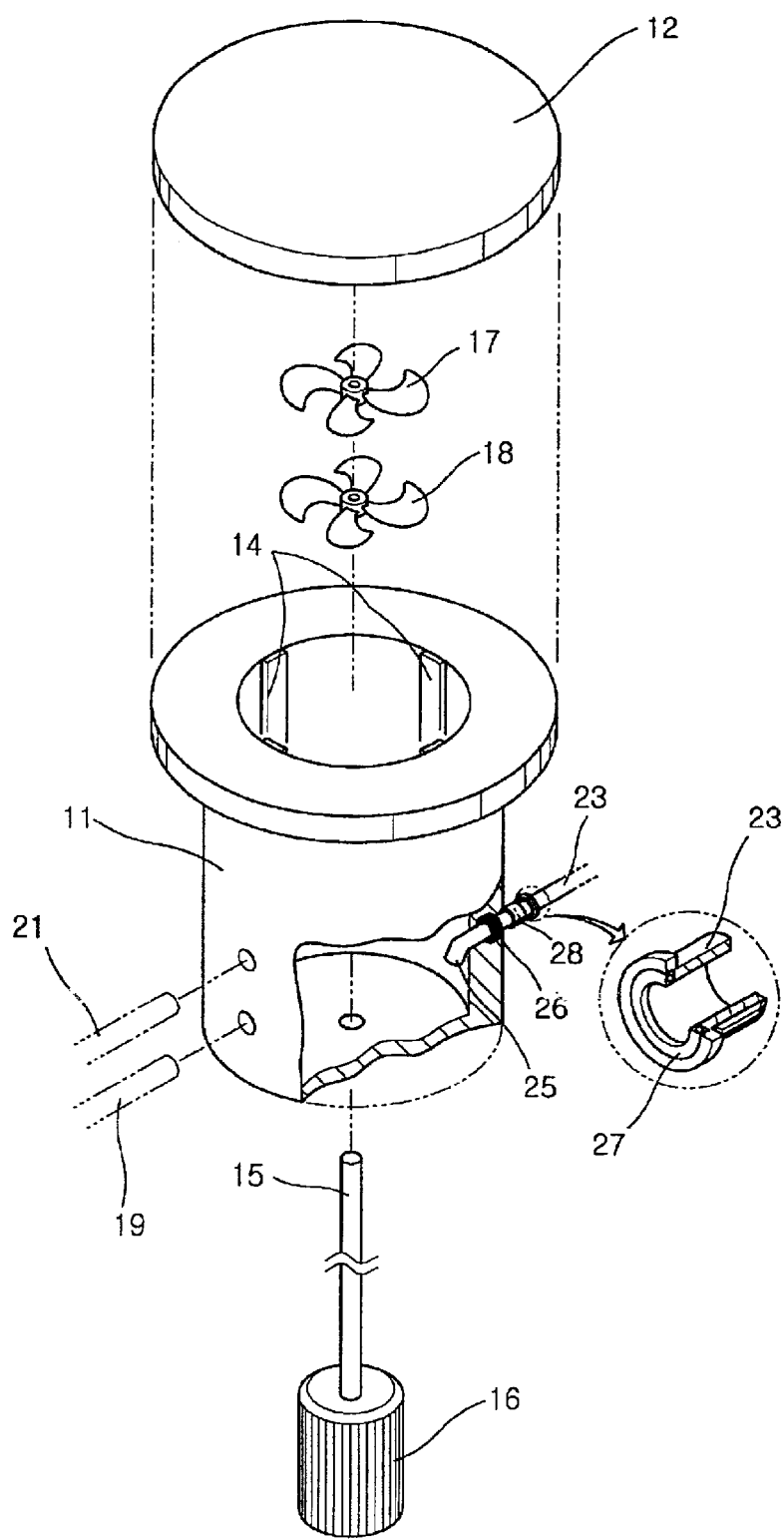
FIG. 2 is an exploded perspective view of the liquid phase oxidation reactor of FIG. 1.

Referring to FIGS. 1–4, a liquid phase oxidation reactor according to a first embodiment of the present invention includes a reaction vessel 11 of a substantially cylindrical shape, and a lid 12 combined with the reaction vessel 11 and sealed on the top of the reaction vessel 11. The reaction vessel 11 which is a place where a reactant is supplied such that reaction occurs, is made of metal having a predetermined thickness sufficient to withstand reaction pressure exerted on the inside thereof, and the interior space has a cylindrical shape such that an upper stirring blade 17 and a lower stirring blade 18, which will be described below, can rotate smoothly. Here, reference numeral 14 denotes a baffle plate for facilitating the mixing of reactants, which is known in the art. The lid 12 is combined with the rim of the reaction vessel 11 to completely seal the interior space of the reaction vessel 11.

A driving shaft 15, which rotates by a driving force from a driving source 16 disposed on the outside of the reaction vessel 11, is installed in the reaction vessel 11, and one or more stirring blades, for example, the upper and lower stirring blades 17 and 18 in this embodiment, are installed along the driving shaft 15. The driving shaft 15, which passes through the center of the bottom of the reaction vessel 11, is connected to the external driving source 16 such as a drive motor in order to rotate.

The upper and lower stirring blades 17 and 18 disposed along an axis of the driving shaft 15 are spaced apart from each other. Rotation of the upper and lower stirring blades 17 and 18 causes the reactant to be stirred while promoting oxidation reaction of an injected oxygen-containing gas with the reactant.

A liquid phase supplying line 19 and a liquid phase discharging line 21 are installed at sidewalls of the reaction vessel 11 for supplying a liquid phase reactant to and draining a product obtained from the reaction from the interior space of the reaction vessel 11. The liquid phase supplying line 19 supplies the liquid phase reactant, for example, alkyl substituted aromatics such as para-xylene and a mixture of a reaction solvent such as acetic acid and an oxidation catalyst, to the reaction vessel 11. The liquid phase supplying line 19, which passes through the sidewall of the reaction vessel 11, is connected to a storage tank 20 in which the liquid phase reactant is stored. An outlet of the liquid phase supplying line 19 is preferably disposed opposite a space between the upper and lower stirring blades 17 and 18 in order to supply the reactant to the space therebetween. The liquid phase discharging line 21 for draining slurry created as chemical reaction of the reactant proceeds out of the reaction vessel 11 passes through the sidewall of the reaction vessel 11 and is connected to a receiving tank 22 for receiving and supplying the product for a subsequent process.

A gas feed nozzle 25 also is disposed in a bent shape at the sidewall of the reaction vessel 11 for providing the oxygen-containing gas to the reaction vessel 11. The gas feed nozzle 25 is connected to a gas supplying line 23 connected to a gas supplying portion 24 for supplying the oxygen-containing gas such as oxygen or air.

Figure 4:
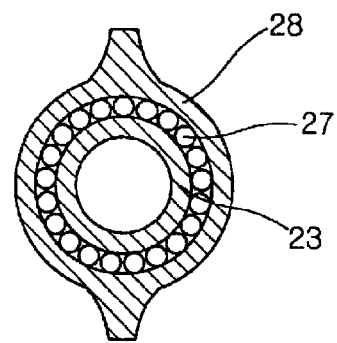
FIG. 4 is a cross-section of the control lever of FIG. 3.

The effective contact time during which the liquid reactant is in contact with oxygen is controlled by varying the angle of the gas feed nozzle 25. The angle of the gas feed nozzle 25 is either fixed at a chose value or varied through an angle adjusting means. In the latter case, an angle adjusting member for supporting the gas feed nozzle 25 so that it can rotate is disposed between the gas feed nozzle 25 and the reaction vessel 11 so that an outlet of the gas feed nozzle 25 opposes the stirring blades 17 and 18 or the interior sidewall of the reaction vessel 11. The angle adjusting member includes a first bearing 26 supported by a through hole in the reaction vessel 11 so that the gas feed nozzle 25 can be rotatably inserted, a control lever 28 fixed to the gas feed nozzle 25 on the outside of the reaction vessel 11 for manually controlling its direction, and a second bearing 27 disposed between the gas feed nozzle 25 and the gas supplying line 23, which will be described below, for supporting the gas feed nozzle 25 so that it can rotate with respect to the gas supplying line 23. The gas feed nozzle 25 is rotatably supported by the first bearing 26 disposed in the through hole of the reaction vessel 11 and the second bearing 27 disposed at a front end of the gas supplying line 23, thereby enabling bi-directional rotation. The control lever 28 is complementarily fixed to the gas feed nozzle 25 and has a structure as shown in FIG. 4 so that its direction can be manually adjusted. The rotation of the control lever 28 rotates the gas feed nozzle 25. Thus, the control lever 28 controls an angle of the outlet of the gas feed nozzle 25. The control lever 28 may be forcibly fitted into a middle portion in the body of the gas feed nozzle 25 or coupled by bonding or a screw.

Figure 3:
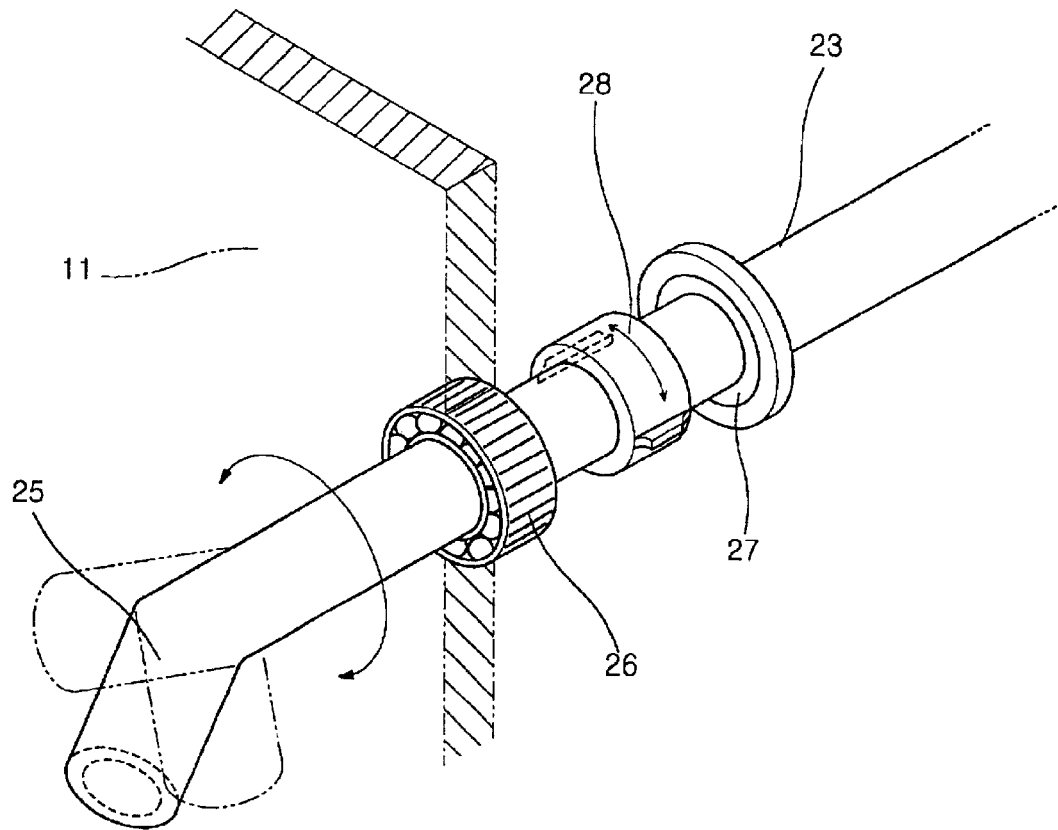
FIG. 3 shows the rotation of the bent gas feed nozzle of FIG. 2.

As shown in FIG. 3, the gas feed nozzle 25 is turned as the control lever turns so that the outlet of the gas feed nozzle 25, through which gas is output, faces the lower stirring blade 18 or the interior side wall of the reaction vessel 11.

Figure 6:
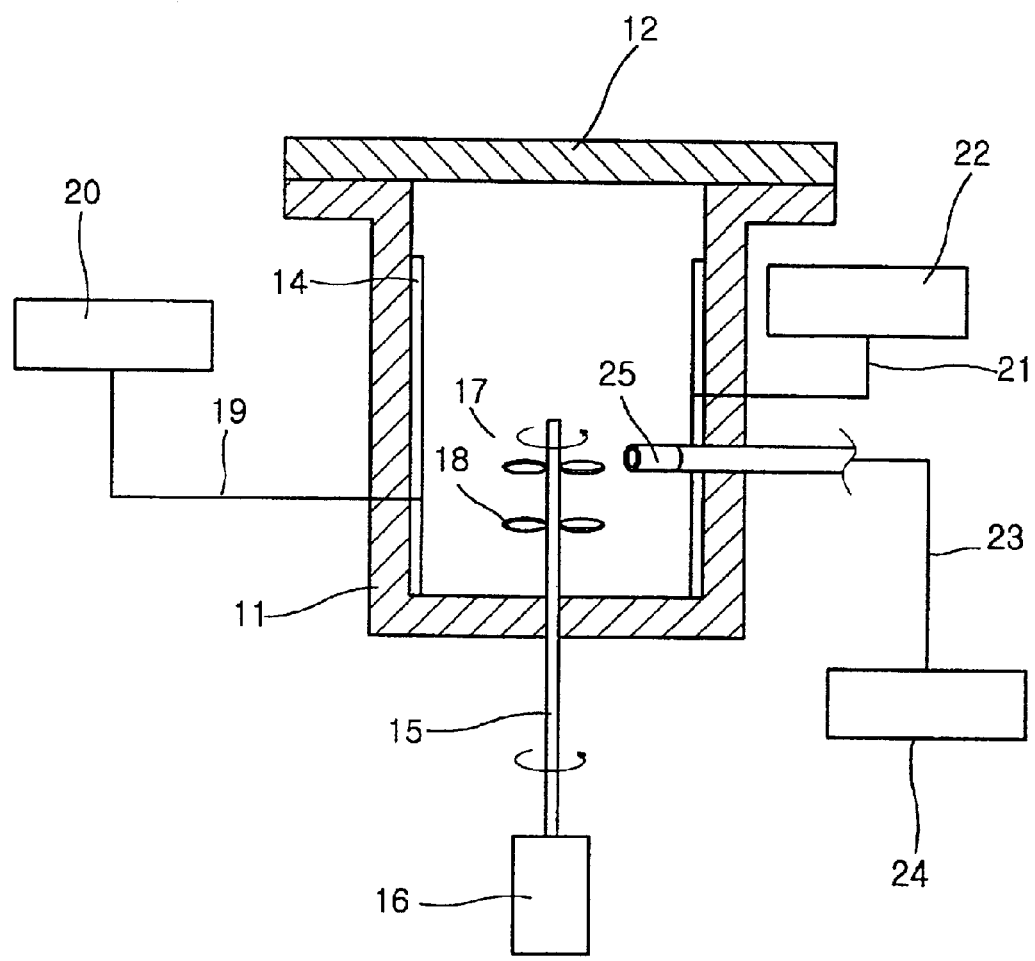
FIG. 6 is a schematic cross-section of a liquid phase oxidation reactor according to a second preferred embodiment of the present invention.

FIG. 6 is schematic cross-section of a liquid phase oxidation reactor according to a second embodiment of the present invention. Here, the same reference number shown in FIG. 6 represent the same element of the first embodiment shown in FIG. 1.

The liquid phase oxidation reactor according to the second embodiment of the present invention includes a reaction vessel 11, a lid 12, one or more stirring blades 18 rotating by a driving source 16, a liquid phase supplying line 19 for supplying a liquid phase reactant to the reaction vessel 11, a liquid phase discharging line 21 for discharging a product obtained through a chemical reaction out of the reaction vessel 11; a gas feed nozzle 25 formed in a bent shape for supplying an oxygen containing gas to the reaction vessel 11 and fixedly installed so that its outlet faces the interior sidewall of the reaction vessel 11, The difference from the first embodiment is that the gas feed nozzle 25 is fixedly welded to a through hole formed at the sidewall of the reaction vessel 11 when the oxidation reactor is operated with a low load.

The operation of a liquid phase oxidation reactor having a structure as described above and the effect of this operation will now be described.

Figure 5:
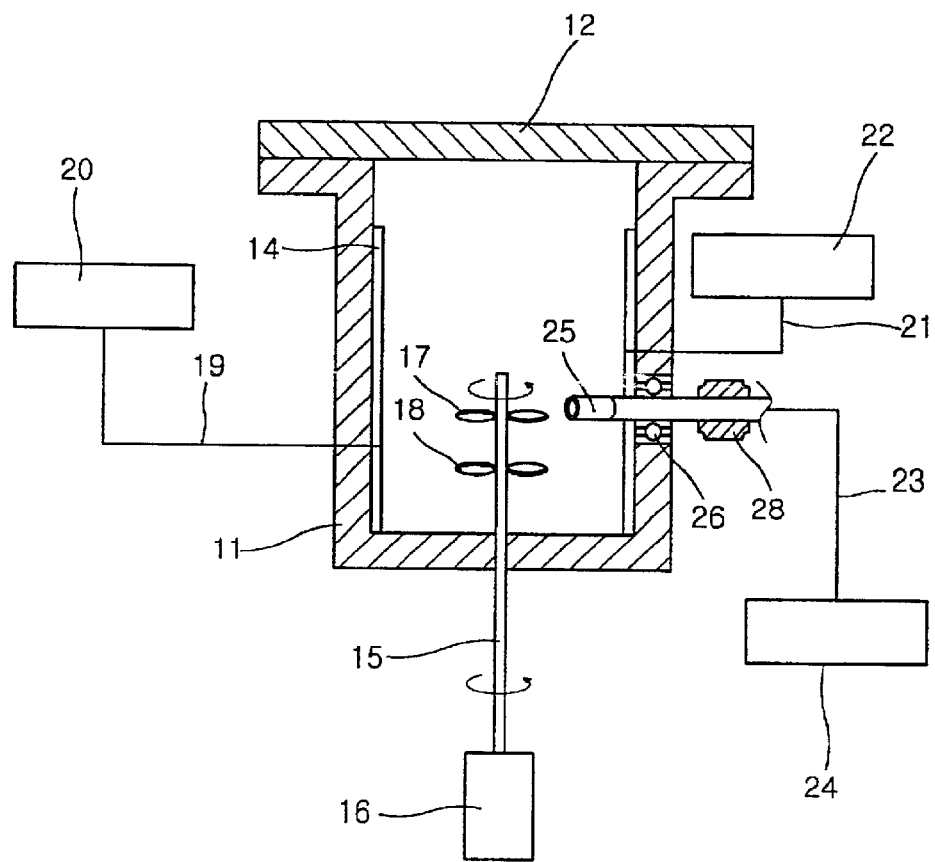
FIG. 5 shows arrangement of the gas feed nozzle in the liquid phase oxidation reactor of FIG. 1 when a load is low.

When the liquid phase oxidation reactor is operated with a high load to manufacture an aromatic organic acid, as shown in FIGS. 1 and 3, the control lever 28 is manipulated in a direction indicated by an arrow so that the outlet of the gas feed nozzle 25 opposes the lower stirring blade 18, thus maximizing the effective contact time during which gas is in contact with liquid reactants. On the other hand, when the liquid phase oxidation reactor is operated with a low load to manufacture the aromatic organic acid, as shown in FIG. 5, the outlet of the gas feed nozzle 25 opposes the interior sidewall of the reaction vessel 11, thus minimizing the effective contact time.

For example,in order to operate the liquid phase oxidation reactor and manufacture aromatic organic acid, first, aromatic compounds having alkyl substitute(s) and/or partially oxidized alkyl substitute(s), a reaction solvent, and an oxidation catalyst are supplied to the reaction vessel 11. More specifically, the aromatic compounds may be monocyclic or polycyclic, and the alkyl substitutes may be alkyl radicals containing 1–4 carbon atoms such as methyl, ethyl, n-propyl, or isopropyl. The partially oxidized alkyl radicals may be phenylene, acylene, carbonylene, or hydroxyalkylene radicals.

Examples of an aromatic compound having alkyl substitute(s) may include: a dialkylbenzene or polyalkylbenzene series containing 1–4 carbon atoms and 2–4 alkyl radicals such as m-diisopropylbenzene, pdisopropylbenzene, m-xylene, p-xylene, trimnethylbenzene, or tetramethylbenzene; a dialkylnaphthalene or polyalkylnaphthalene series containing 1–4 carbon atoms and 2–4 alkyl radicals such as dimethylnaphthatene, diethylnaphthalene, or disopropylnaphthalene; and a polyalkylbiphenyl series containing 1–4 carbon atoms and 2–4 alkyl radicals such as dimethylbiphenyl. Furthermore, an aromatic compound having one or more partially oxidized alkyl radicals refers to an aromatic compound having one or more alkyl substitutes of the alkyl substituted aromatic compound as described above which are partially oxidized to phenyl, acyl, carbonyl, or hydroxyalkyl. The aromatic compound having one or more partially oxidized alkyl radicals may 3-methylbenzaldehyde, 4-methylbenzaldehyde, m-toluic acid, p-toluic acid, 3-phenylbenzoic(benzophosphoric)acid, 4-phenyl-benzoic acid, or phenylnaphthalene.

In the method of manufacturing an aromatic organic acid according to the present invention, a heavy metal compound and a bromide compound are used as catalyst materials. A heavy metal of the heavy metal compound may be cobalt, manganese, nickel, chromium, zirconium, copper, lead, hafnium or cerium, or a combination of the above heavy metals, and most preferred is a combination of a manganese and a cobalt species. The heavy metal compound may be an acetate, nitrate, acetylacetonate, naphthalate, stearinate, and bromide, and most preferred is an acetate. Examples of the bromide compound may include an inorganic bromide such as molecular bromine, hydrogen bromide, sodium bromide, potassium bromide, cobalt bromide, or manganese bromide, and organic bromide such as methylbromide, methylenebromide, bromoform, benzyl bromide, bromomethyltoluene, dibromoethane, tribromoethane, or tetrabromoethane.

A catalyst combination of the heavy metal compound and the bromide compound as described above preferably includes 1 mole of heavy metal and 0.05–10, more preferably, 0.1–2 moles of bromide compound. The concentrations of the heavy metal catalyst in the reaction solvent are typically in the range of 10–10,000 ppm, and preferably in the range of 100–5,000 ppm. A lower aliphatic carboxylic acid used as a reaction solvent may be acetic acid, propionic acid, or butylic acid. The lower aliphatic carboxylic acid or an aqueous solution thereof may be used as a reaction solvent. For example, the reaction solvent may be acetic acid, propionic acid, butylic acid, mixtures thereof, or a mixture of the low aliphatic carboxylic acid and water. The most preferred solvent is a mixture of 100 parts by weight acetic acid with preferably 1–20 parts and more preferably 5–15 parts by weight water. The amount of solvent to be used is 1–70 parts by weight per part by weight starting aromatic compound to be oxidized in liquid phase in the reaction vessel 11. In this case, the amount of solvent is preferably 2–50 parts by weight, and more preferably 2–6 parts by weight. Thus, the weight ratio of the solvent to the aromatic compound is in the range from 1:1 to 70:1, preferably in the range from 2:1 to 50:1, and more preferably in the range from 2:1 to 6:1. When the amount of reaction solvent to be used is in the range from 2:1 to 6:1, the amount of undissolved solid aromatic compound in the reaction mixture is lowered to promote diffusion of a molecular oxygen into the reaction solvent, which will be described below, thereby allowing for high speed reaction and manufacture of high quality aromatic organic acid.

Then, as shown in FIG. 5, the user turns the control lever 28 so that the outlet of the gas feed nozzle 25 opposes the interior wall of the reaction vessel 11. As a result, the body of the gas feed nozzle 25 is supported by the first and second bearings 26 and 27 to turn the gas feed nozzle 25 to an extent to which the control lever 28 turns, and the injection angle of the outlet thereof is controlled to oppose the interior wall of the reaction vessel 11. Then, oxygen gas or air is injected into the reaction vessel 11 through the gas supplying line 23. Here, if air is used as the oxygen containing gas, the air is supplied as an oxidizing agent at a ratio of 2–20 $Nm^3$ and preferably 2.5–15 $Nm^3$ per 1 kg of the aromatic compound. Here, bubbles of the oxygen containing gas in the reactant are circulated in the reactor along with a stirred stream of the reactants.

Then, the driving source 16 is operated to rotate the driving shaft 15. Rotating the driving shaft 15 causes the upper and lower stirring blades 17 and 18 to rotate, thereby stirring the reactants supplied to the reaction vessel 11. Furthermore, the oxygen gas or air bubbles collect against the inner wall of the reaction vessel 11, and although the oxygen gas or air contacts the reactants thereby causing oxidation reaction, oxidation occurs to a lesser extent than if the bubbles collide with the lower stirring blade 18. That is, since the oxygen gas or air collects against the inner wall of the reaction vessel 11, the oxygen gas or air is affected little by the lower stirring blade 18, thus contacting or mixing of the gas with the reactants is made to a smaller extent. As a result, an effective contact time, during which the reaction is performed by causing the oxygen containing gas to contact the liquid reactants, is decreased thereby significantly reducing the oxidation of reaction solvent.

Along with the oxidation of reaction solvent, an aromatic alkyl compound is oxidized to become a corresponding aromatic carboxylic acid and precipitated as crystals from the reactants to form a slurry. The slurry is discharged from the reactor to the receiving tank 22 through the liquid phase discharging line 21 and then is subjected to purification. Tables 1 and 2 show a yield of terephthalic acid and production of carbon dioxide from acetic acid when an aromatic organic acid was manufactured by the oxidation reactor according to the present invention.

TABLE 1

| Reaction time (min) | Terephthalic acid concentration (mol) |
| --- | --- |
| 0 | 0.0 |
| 2 | 0.2 |
| 4 | 0.6 |
| 6 | 0.76 |
| 8 | 0.86 |
| 10 | 0.92 |
| 12 | 0.96 |

TABLE 2

| Reaction time (min) | Carbon dioxide production amount (mol) |
| --- | --- |
| 0 | 0.0 |
| 25 | 0.012 |
| 50 | 0.029 |
| 100 | 0.087 |
| 150 | 0.128 |

Here, the catalyst make up was 8 mg/L of $Co^{2+}$, 4 mg/L of $Mn^{2+}$, 12 mg/L of $Br^-$, and 1 mol of para-xylene. The consumption rate of air is 40 L/min. The oxidation was performed at 220 degrees C.

The results listed in Table 1 demonstrate complete conversion of the para-xylene to the terephthalic acid within a short reaction time. Conventionally, reactors are designed to have an excessively large reaction time and produce a large amount of carbon dioxide created by combustion of acetic acid, which is the reaction solvent, which results in unnecessary consumption of the reaction solvent corresponding to the production amount of carbon dioxide. However, according to the present invention, as evident from Table 1, only about 25 minute reaction time is necessary to achieve the oxidation reaction, and as an actual residence time is shortened from 50 to 25 minutes, the amount of oxidized reaction solvent is reduced by 0.017 mol or 59.8% compared to the conventional art. The actual residence for a continuous oxidation reactor could be conveniently controlled by the angle of the gas feed nozzle.

As described above, the turning angle of outlet of the gas feed nozzle in the liquid phase oxidation reactor according to the present invention is controlled such that the outlet of the gas feed nozzle faces the interior wall of the reaction vessel, or the gas feed nozzle is fixedly installed so that its outlet faces the interior side wall of the reaction vessel, thereby minimizing effective contact time of a reaction. The minimized residence time of the reaction reduces a process cost, and an oxidation amount and consumption of the reaction solvent as much as possible.

What is claimed is:

1. A liquid phase oxidation reactor comprising:
   a substantially cylindrical reaction vessel having an interior space;
   a lid combined with and closing the reaction vessel;
   at least one stirring blade disposed within the reaction vessel and rotated by a driving source outside of the reaction vessel;
   a liquid phase supplying line penetrating a sidewall of the reaction vessel for supplying a liquid phase reactant to the reaction vessel;
   a liquid phase discharging line penetrating the sidewall of the reaction vessel for draining from the reaction vessel a product produced by a chemical reaction in the reaction vessel;
   a gas feed nozzle penetrating the sidewall of the reaction vessel and including a bend within the reaction vessel for supplying an oxygen-containing gas to the reaction vessel; and
   angle adjusting means supporting the gas feed nozzle for turning the gas feed nozzle so that an outlet of the gas feed nozzle may be selectively directed toward the stirring blade or toward the sidewall of the reaction vessel.

2. The liquid phase oxidation reactor of claim 1, wherein the angle adjusting means comprises a bearing fixed in a through hole in the sidewall of the reaction vessel and supporting the gas feed nozzle so that the gas feed nozzle can be turned.

3. The liquid phase oxidation reactor of claim 1, wherein the angle adjusting means further comprises a control lever fixed to the gas feed nozzle and disposed outside of the reaction vessel for manual manipulation.

4. The liquid phase oxidation reactor of claim 3, wherein the angle adjusting means further comprises a bearing disposed between the gas feed nozzle and a gas supplying line for supplying the oxygen-containing gas to the gas feed nozzle, and supporting the gas feed nozzle so that the gas feed nozzle can turn with respect to the gas supplying line.

5. A liquid phase oxidation reactor comprising:
   a substantially cylindrical reaction vessel having an interior space;
   a lid combined with and closing the reaction vessel;
   at least on stirring blade disposed within the reaction vessel and rotated by a driving source outside of the reaction vessel;
   a liquid phase supplying line penetrating a sidewall of the reaction vessel for supplying a liquid phase reactant to the reaction vessel;
   a liquid phase discharging line penetrating the sidewall of the reaction vessel for draining from the reaction vessel a product produced by a chemical reaction in the reaction vessel; and
   a gas feed nozzle penetrating the sidewall of the reaction vessel and including a bend within the reaction vessel for supplying an oxygen-containing gas to the reaction vessel, the gas feed nozzle being fixedly mounted in the sidewall of the reaction vessel so that an outlet of the gas feed nozzle faces the sidewall of the reaction vessel.

* * * * *